(12) United States Patent
Zhong

(10) Patent No.: US 8,325,793 B2
(45) Date of Patent: Dec. 4, 2012

(54) PRECURSOR ISI CANCELLATION USING ADAPTATION OF NEGATIVE GAIN LINEAR EQUALIZER

(75) Inventor: Lizhi Zhong, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 854 days.

(21) Appl. No.: 12/435,538

(22) Filed: May 5, 2009

(65) Prior Publication Data
US 2010/0284686 A1 Nov. 11, 2010

(51) Int. Cl.
*H03H 7/30* (2006.01)
(52) U.S. Cl. ...................................... 375/233
(58) Field of Classification Search ........... 375/229–236
See application file for complete search history.

(56) References Cited

U.S. PATENT DOCUMENTS

| | | | |
|---|---|---|---|
| 4,468,786 A | 8/1984 | Davis | 375/11 |
| 6,912,250 B1 | 6/2005 | Adireddy et al. | 375/232 |
| 7,471,904 B2 | 12/2008 | Kaneda et al. | 398/208 |
| 2009/0268802 A1* | 10/2009 | Wang | 375/233 |

OTHER PUBLICATIONS

Ren, Jihong et al., "Precursor ISI Reduction in High-Speed I/O", 2007 Symposium on VLSI Circuits Digest of Technical Papers, pp. 134-135.
Watts, P.M., et al., "Performance Limits of Electronic Feed-Forward and Decision Feedback Equalizers for Single Mode Fibre Links", ECOC 2005 Proceedings—vol. 2, Paper TU 3.3.3, pp. 203-204.

\* cited by examiner

*Primary Examiner* — Kevin Kim
(74) *Attorney, Agent, or Firm* — Christopher P. Maiorana, PC

(57) ABSTRACT

An apparatus including a first circuit and a second circuit. The first circuit may be configured to generate an equalized signal in response to an input signal and an equalizer parameter signal. The equalizer parameter signal generally causes a cancellation of pre-cursor inter-symbol interference from a plurality of symbols in the input signal. The second circuit may be configured to generate (i) the equalizer parameter signal, (ii) a control signal and (iii) a data output signal in response to the equalized signal. The control signal generally causes an adjustment of the equalizer parameter signal. The adjustment of the equalizer parameter signal generally causes a decrease in the pre-cursor inter-symbol interference from the symbols.

20 Claims, 10 Drawing Sheets

PRECURSOR ISI CANCELLATION USING ADAPTATION OF NEGATIVE GAIN LINEAR EQUALIZER

FIELD OF THE INVENTION

The present invention relates to receivers of digital communications generally and, more particularly, to a method and/or apparatus for implementing precursor inter symbol interference (ISI) cancellation using adaptation of negative gain linear equalizer.

BACKGROUND OF THE INVENTION

Clock and Data Recovery (CDR) circuits form a part of Serializer-Deserializer (SerDes) receivers. Conventional CDR circuits can be designed to achieve bit-error-ratios (BER) on the order of $10^{-12}$ to $10^{-15}$ errors per bit. The CDR circuits use a sampling point that tracks the phase of a sampling clock based on some criterion, such as minimizing a Mean-Squared-Error (MSE). The optimal sampling point for CDR is the point at which a vertical eye opening is the largest. When the sampling phase is away from the optimal sampling point, the vertical eye margin is significantly reduced.

With enough jitter, a receiver can sample at a position where the vertical eye margin is not large enough to decode a bit correctly, causing bit errors. One conventional technique to avoid bit errors is to use a finite impulse response (FIR) filter on the transmitter side of a communication channel to reduce the pre-cursor inter-symbol interference (ISI). However, in optical communication modules, a FIR filter on the transmitter side is not possible. Consequently, in optical systems, pre-cursor ISI can only be cancelled at the receiver side of the communication channel.

The CDR circuits commonly used in receivers can be broadly classified into two categories, bang-bang CDR and baud-rate CDR. Each class has associated advantages and disadvantages. In a bang-bang, or Alexander type CDR circuit, a received signal is oversampled (i.e., sampled twice each symbol period). The symbol period is referred to as a Unit Interval (UI). Oversampling adds cost and complexity to the system. Oversampling requires a second clock having a 90 degrees phase difference from the data sampling clock and a separate capture latch to sample the received signal at crossings. The addition of the second clock and capture latch results in additional power and area for the receiver.

Ideally, one sample is obtained at a crossing boundary and another sample is obtained at a center of the slicer input eye. In a bang-bang CDR, the eye appears symmetric about the sampling point. The symmetric eye is desirable for good Sinusoidal Jitter Tolerance (SJT). SJT is the amplitude of sinusoidal jitter about the sampling point that can be tolerated without errors. However, better jitter tolerance comes at the cost of oversampling the signal. Two consecutive "center" data samples (i.e., d[k-1] and d[k]) and one crossing sample in-between (i.e., p[k]) are used to decide whether a current sampling phase is lagging or leading. The sampling phase is then corrected accordingly. Unlike baud-rate CDR, bang-bang CDR is not sensitive to pre-cursor ISI. However, making bang-bang CDR work with a Decision-Feedback Equalizer (DFE) based receiver is not trivial.

In a baud-rate CDR circuit, the received signal is sampled at the baud rate, or once every UI. Hence, oversampling does not occur in the baud-rate CDR circuit. The sampling phase can be chosen based on different criteria. For example, in an MMSE baud-rate CDR circuit, the sampling phase that yields a minimum MSE is chosen. In a Mueller-Muller baud-rate CDR circuit, the sampling phase is chosen such that a first pre-cursor of an equalized pulse and a first post-cursor of the equalized pulse are equal about the sampling point. The sampling point chosen can be at a point other than in the center of the equalized eye if the equalized pulse is not symmetrical in terms of first pre-cursor and first post-cursor.

Referring to FIG. 1, a diagram is shown illustrating a normalized graph of an unequalized channel impulse response 10 and an equalized channel impulse response 12. In a baud-rate CDR circuit where a convergence point (i.e., a settling point $\tau$) relies on a first pre-cursor matching a first post-cursor (i.e., $h(1)=h(-1)$, where $h(1)$ is the first pre-cursor of the channel impulse response and $h(-1)$ is the first post-cursor of the channel impulse response), a residual pre-cursor sample 14 (i.e., $p_{-1}(0)$) can have a major impact on the settling point $\tau$ of a Mueller-Muller baud-rate CDR circuit. The residual pre-cursor sample 14 causes the Mueller-Muller baud-rate CDR circuit to shift the sampling phase to the left of the peak of the impulse response 10 (ideally the unequalized sample 16 at time=0) so that a first pre-cursor 18 (i.e., $p_{-1}(\tau)$), with respect to the sampling point $\tau$, has an amplitude close to zero. Accordingly, the magnitude of a first post-cursor 20 (i.e., $p_1(0)$) in the unequalized impulse response 10 increases from $p_1(0)$ to $p_1(\tau)$ because of the shifting of the sampling phase to the left.

Referring to FIG. 2, an eye diagram is shown illustrating a conventional slicer input eye 30 of a Decision-Feedback Equalizer (DFE) receiver with un-cancelled pre-cursor inter-symbol interference (ISI). The DFE can cancel post-cursor ISI in the unequalized impulse response 10. Pre-cursor inter symbol interference (ISI) resulting from the communication channel can cause the baud-rate CDR circuit to settle to the left of the optimal sampling point of the received eye opening. The baud-rate CDR settles where $h(1)=h(-1)$. With a decision feedback equalizer (DFE), $h(1)$ is reduced to zero. However, in a conventional system $h(-1)$ cannot be reduced to zero due to a lack of pre-cursor ISI cancellation. As a result, a phase of the baud-rate CDR moves left from the optimal sampling point on the impulse response until the point of $h(1)=h(-1)$ is reached. When the sampling point moves left, $h(1)$ slowly increases and $h(-1)$ slowly decreases. The SJT (i.e., 2*HL) is reduced compared with the ideal sample point at time=0. Thus, in optical applications where a transmitter finite impulse response (TX-FIR) filter is not available, the Mueller-Muller baud-rate CDR suffers from poor SJT compared with the more costly and complex bang-bang CDR.

The resulting equalized impulse response 12 has the first pre-cursor sample 18 (i.e., $p^e_{-1}(\tau)=0$) and a first equalized post-cursor sample 22 (i.e., $p^e_{+1}(\tau)=0$). The superscript "e" is used herein to denote an equalized sample. The first pre-cursor sample 18 and the first equalized post-cursor sample 22 have magnitudes near zero. The conventional slicer input eye 30 is asymmetric about the sampling point $\tau$. In particular, a left horizontal eye opening (i.e., HL) is smaller than a right horizontal eye opening (i.e., HR).

It would be desirable to have a baud-rate CDR receiver circuit that can provide pre-cursor ISI cancellation.

SUMMARY OF THE INVENTION

The present invention concerns an apparatus including a first circuit and a second circuit. The first circuit may be configured to generate an equalized signal in response to an input signal and an equalizer parameter signal. The equalizer parameter signal generally causes a cancellation of pre-cursor inter-symbol interference from a plurality of symbols in the input signal. The second circuit may be configured to generate (i) the equalizer parameter signal, (ii) a control signal and (iii) a data output signal in response to the equalized signal. The control signal generally causes an adjustment of the equalizer parameter signal. The adjustment of the equalizer parameter signal generally causes a decrease in the pre-cursor inter-symbol interference from the symbols.

The objects, features and advantages of the present invention include providing a method and/or apparatus for implementing precursor inter symbol interference (ISI) cancellation using adaptation of negative gain linear equalizer that may (i) provide a linear equalizer using negative gain, (ii) provide a linear equalizer having a high frequency pole, (iii) reduce crosstalk, (iv) cancel the first precursor ISI without significantly enhancing crosstalk, (v) provide baud rate CDR that settles at a point where an eye margin is largest, (vi) center a sample point in a decision-feedback equalized eye of a receiver employing baud-rate clock-data recovery (CDR) and/or (vii) implement a linear equalizer with an order greater than or equal to 1.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
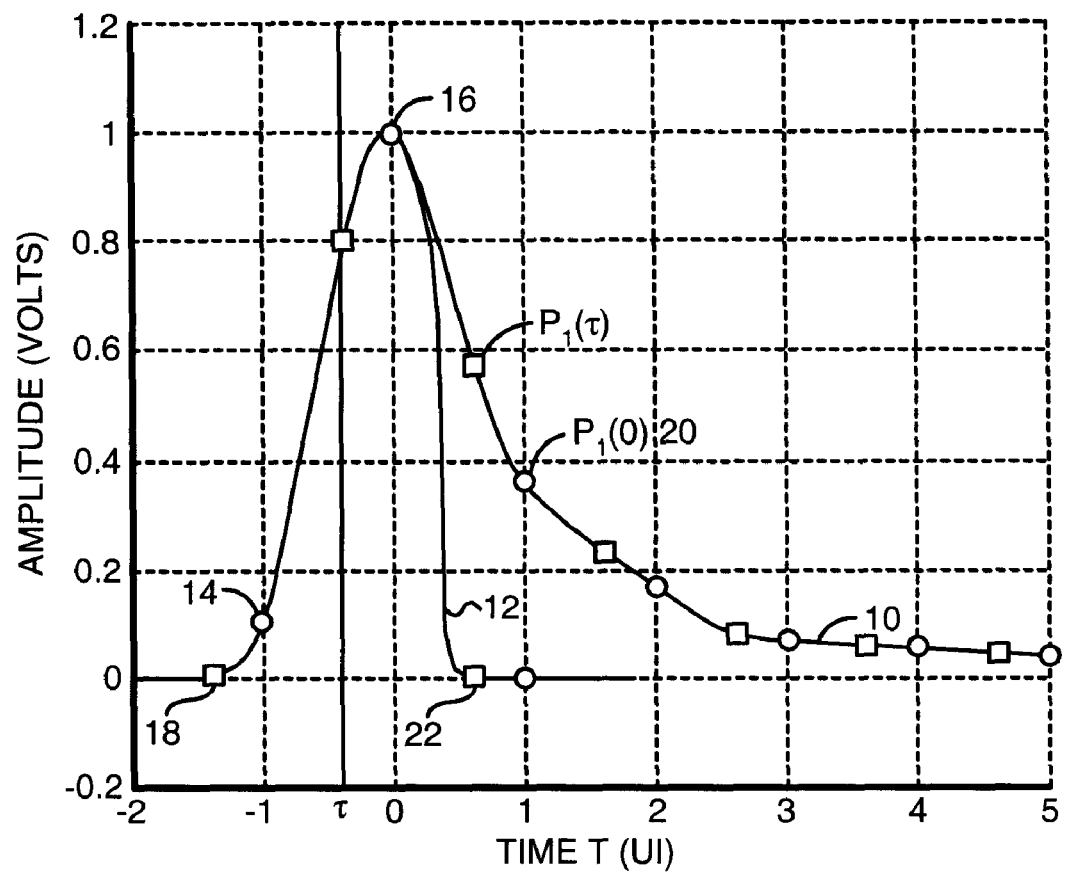
FIG. 1 is a graph illustrating un-equalized and equalized impulse responses of a conventional communication channel.
Figure 2:
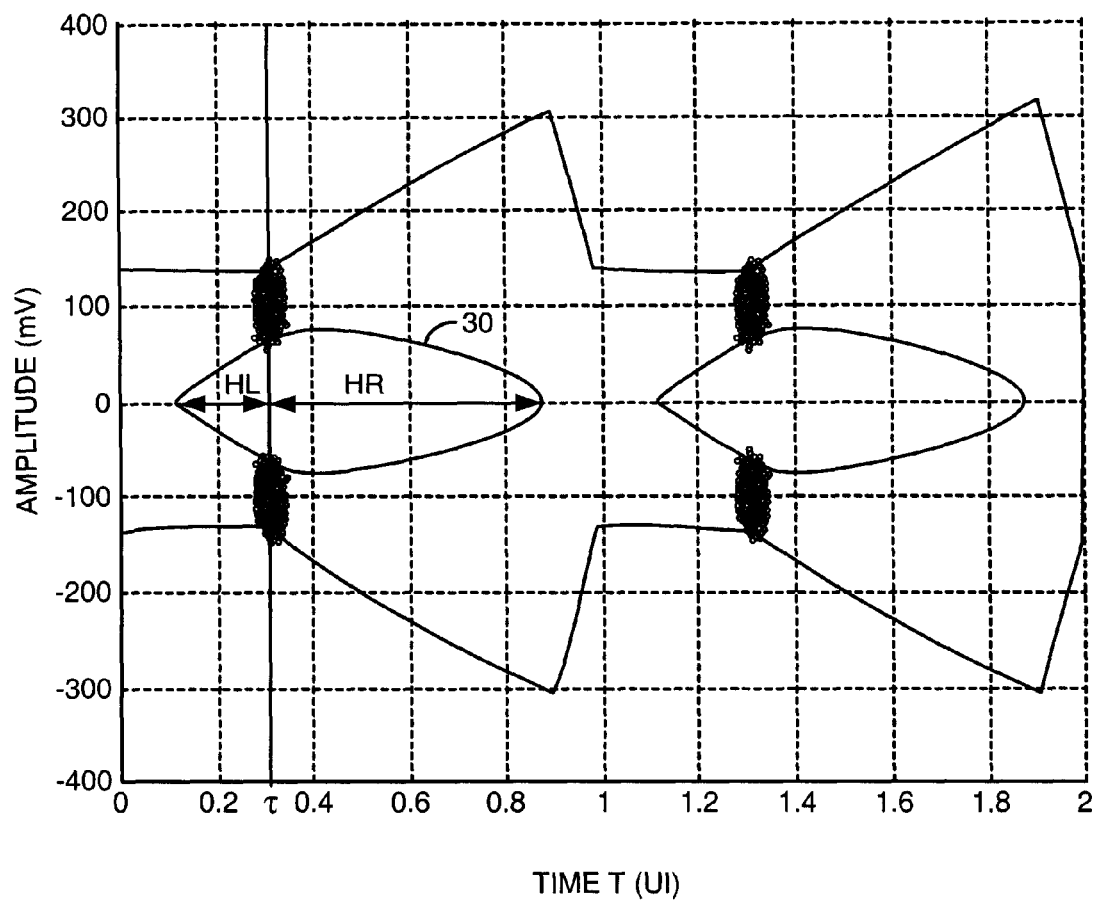
FIG. 2 is an eye diagram illustrating a settling point of a conventional baud-rate clock-data recovery (CDR) circuit.
Figure 3:
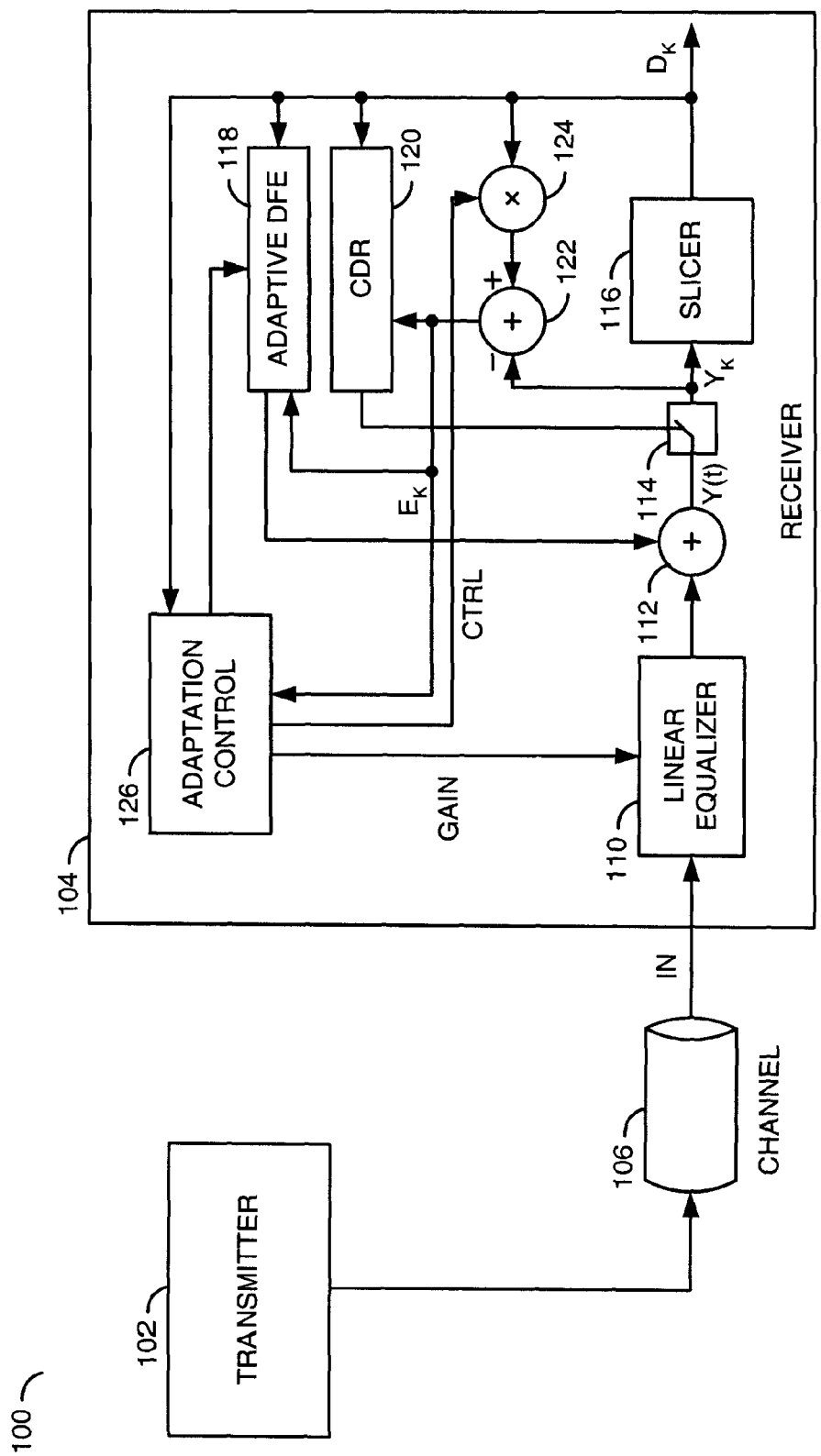
FIG. 3 is a diagram illustrating a receiver in accordance with an example embodiment of the present invention.

Referring to FIG. 3, a block diagram is shown illustrating a communication channel 100 in accordance with an example embodiment of the present invention. The communication channel 100 may comprises a transmitter 102, a receiver 104 and a channel medium 106. The transmitter 102 and the receiver 104 may be implemented, in one example, on different chips. In one example, the channel medium 106 may be implemented as a circuit board, an optical fiber, a wireless medium, a trace, a cable, air and/or free space.

The receiver 104 may comprise a module 110, a module 112, a module 116, a module 118, a module 120, a module 122, a module 124 and a module 126. The modules 110 to 126 may represent circuits and/or blocks that may be implemented as hardware, software, a combination of hardware and software, or other implementations. The module 110 may be implemented as a receiver feed forward equalizer (RX_FFE). In one example, the module 110 may be implemented as an analog filter configured to cancel pre-cursor inter-symbol interference (ISI) from the channel 106. In one example, the analog filter may comprise a linear equalizer. The module 112 may be implemented as an adder. The module 114 may be implemented, in one example, as a analog to digital converter. The module 116 may be implemented as a slicer. The module 118 may be implemented as an adaptive decision feedback equalizer (DFE). The module 120 may be implemented as a baud-rate clock and data recovery (CDR) module. The module 122 may be implemented as an adder. The module 124 may be implemented as a multiplier. The module 126 may be implemented as an adaptation control.

The module 110 may have a first input that may receive a signal (e.g., IN) from the channel medium 106. In one example, the signal IN may be converted from an optical signal to an electrical signal prior to presentation to the input of the module 110. An output of the module 110 may present an equalized version of the received signal with pre-cursor cancellation to a first input of the module 112. An output of the module 112 may present a signal (e.g., Y(t)) to a first input of the module 114. The signal Y(t) may comprise a sum of the equalized signal from the module 110 and a feedback signal from an output of the module 118. An output of the module 114 may present samples (e.g., $Y_K$) of the signal Y(t) to an input of the module 116 and a first input of the module 122. The module 114 may sample the signal Y(t) in response to an output of the module 120. An output of the module 116 may present a data output signal (e.g., $D_K$).

The signal $D_K$ may be presented to a first input of the module 118, a first input of the module 120, a first input of the module 124 and a first input of the module 126. An output of the module 124 may present a signal to a second input of the module 122. The signal presented at the output of the module 124 may comprise a product of the signal $D_K$ and a signal (e.g., CTRL) received from a first output of the module 126. An output of the module 122 may present a signal (e.g., $E_K$) to a second input of the module 118, a second input of the module 120 and a second input of the module 126. A second output of the module 126 may present a signal to a third input of the module 118. A third output of the module 126 may present a signal (e.g., GAIN) to a second input of the module 110.

The signal $E_K$ may comprise an error signal. The signal CTRL may comprise a target signal amplitude. The target signal amplitude (e.g., H0) generally represents a desired signal amplitude (e.g., $E_K = H0*D_K - R_K$). After error is minimized, $R_K$ is close to the desired signal: $H0*D_K$. The signal GAIN may comprise an equalizer parameter signal. In one example, the signal GAIN may comprise a digital representation of a gain value to be set in the module 110. In another example, the signal GAIN may comprise signals for controlling a gain adaptation loop implemented within the module 110. The control signals generated by the module 126 may be configured to control activation and scheduling of equalizer adaptation loops of the linear equalizer 110 and the adaptive DFE 118. In one example, the signal presented by the module 126 to the module 110 may be generated according to the equation $E_K*D_{(K+1)}$.

The equalizer adaptation loops of the linear equalizer 110 and the adaptive DFE 118 may be implemented using conventional techniques modified to allow control in accordance with the present invention. In one example, the adaptive DFE 118 may be implemented as a fixed tap (e.g., 8-10 taps) DFE.

In another example, the adaptive DFE 118 may be implemented as a floating tap DFE. For example, the adaptive DFE 118 may be implemented, in one example, in accordance with commonly-owned co-pending application U.S. Ser. No. 11/777,337, filed Jul. 13, 2007, which is herein incorporated by reference in its entirety. The floating tap DFE generally provides effective cancellation of reflections in the channel medium 106.

In one example, the module 110 may use a simple analog filter to cancel the pre-cursor inter symbol interference (ISI) received at the receiver 104. In one example, the analog filter may be implemented as a 1-tap finite impulse response (FIR) filter. However, higher order FIR filters may be implemented accordingly to meet the design criteria of a particular implementation. In one example, the analog filter may be configured to provide 10% precursor de-emphasis. The linear equalizer in accordance with an example embodiment of the present invention generally differs from a conventional linear equalizer in that:

1) a pole of the linear equalizer 110 may be relatively high; and 2) a transfer function of the linear equalizer 110 may be of the form $(1+gs/(s+p))/(s+pp)^3$, where g represents a negative gain, p represents a pole of the linear equalizer 110, pp represents a parasitic pole of the linear equalizer 110 and s represents the Laplace transform variable. The pole and parasitic pole of the linear equalizer 110 are generally fixed.

In one example, the pole of the linear equalizer 110 may be on the order of the data rate. The linear equalizer 110 may be configured to impact ISI only one unit interval (UI) from the main cursor. The one unit interval generally includes the first pre-cursor ISI and the first post-cursor ISI. For a data rate of 8.5 Gbps, one UI is 1/(8.5 e9). For the data rate of 8.5 Gbps, the pole of the linear equalizer 110 may be set, for example, around 5 GHz. The linear equalizer 110 generally uses a negative gain. By using a negative gain, the amount of high frequency boost provided by the linear equalizer 110 may be significantly reduced. The reduction in the amount of high frequency boost provided by the linear equalizer 110 may reduce crosstalk enhancement.

Figure 4:
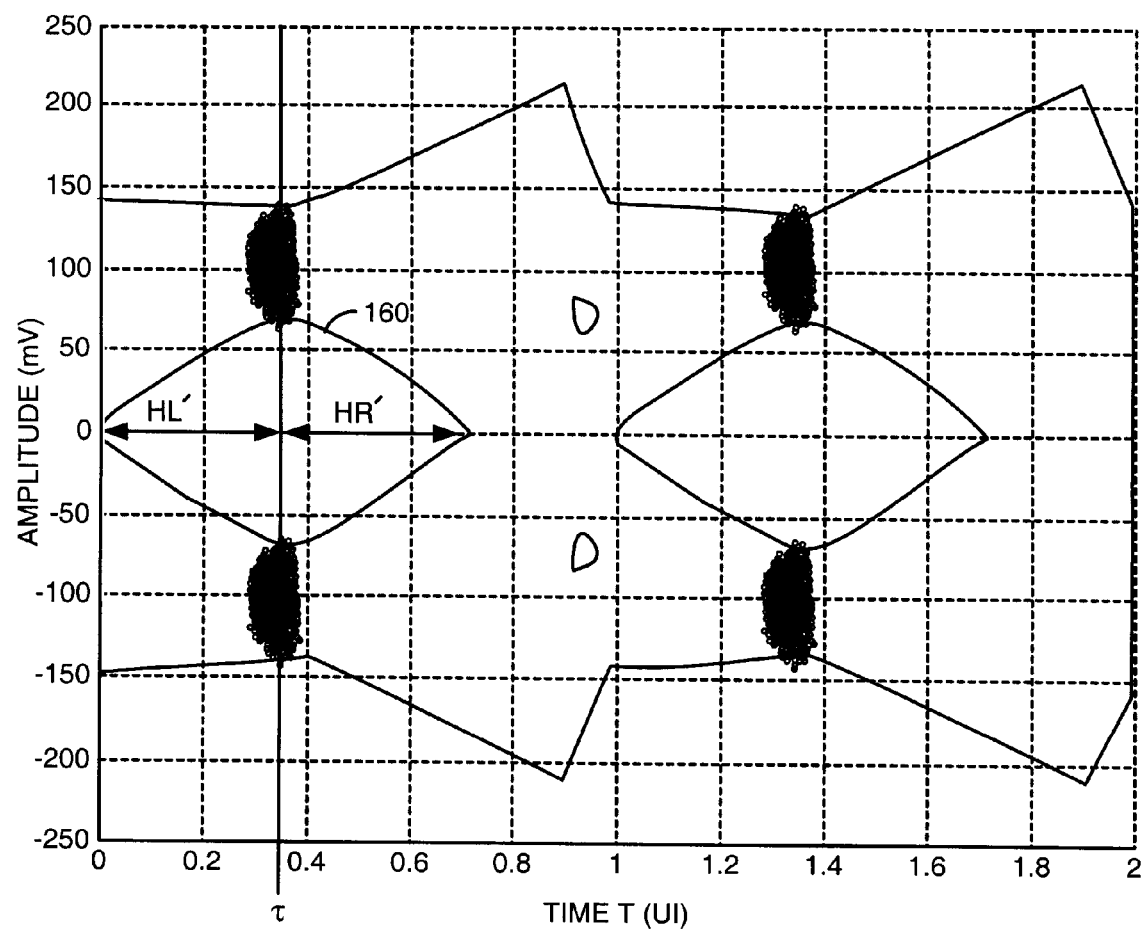
FIG. 4 is an eye diagram illustrating a settling point of a baud-rate CDR circuit implemented in accordance with an example embodiment of the present invention.

Referring to FIG. 4, an eye diagram is shown illustrating a symmetrical eye 160. Equalization techniques in accordance with the teachings of the present disclosure may be used, for example in an optical receiver, to produce the symmetrical eye 160. In one example, the module 110 may be configured to provide 10% pre-cursor de-emphasis. By reducing the residual first pre-cursor ISI, sample point τ may be more centered in the eye 160. In particular, the left horizontal eye opening (e.g., HL') may be approximately the same as the right horizontal eye opening (e.g., HR'). The improved symmetry of the horizontal eye opening (HL'=HR') generally increases the amount of sinusoidal jitter that may be tolerated (e.g., 2*HL'>2*HL).

Figure 5:
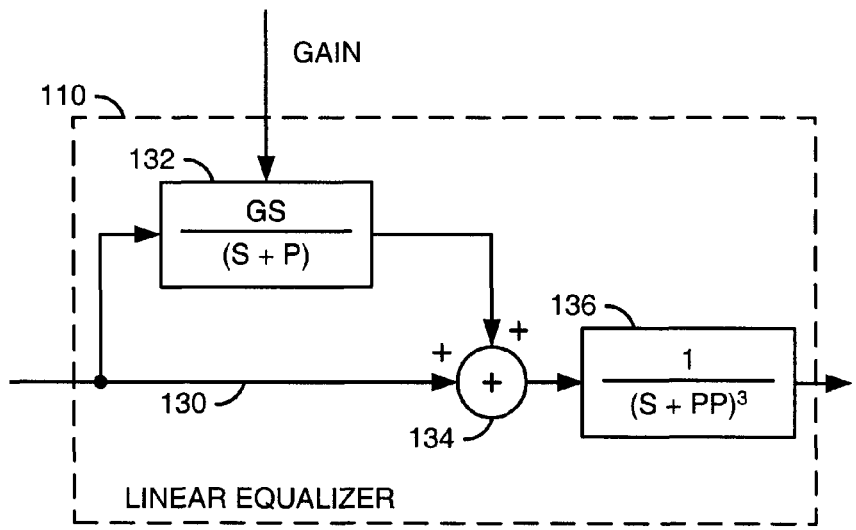
FIG. 5 is a block diagram illustrating an example linear equalizer in accordance with an example embodiment of the present invention.

Referring to FIG. 5, a diagram is shown illustrating an example embodiment of the linear equalizer 110. In one example, the linear equalizer 110 may be implemented having a DC path 130 and a high pass path (e.g., s/(s+p)) 132. The high pass path 132 may include a gain G that may be adapted in response to the signal GAIN, received from the adaptation control module 126. The DC path 130 and the high pass path 132 may be summed with an adder 134. The adder 134 may be followed by parasitic poles (e.g., $1/(s+pp)^3$) 136.

Figure 6:
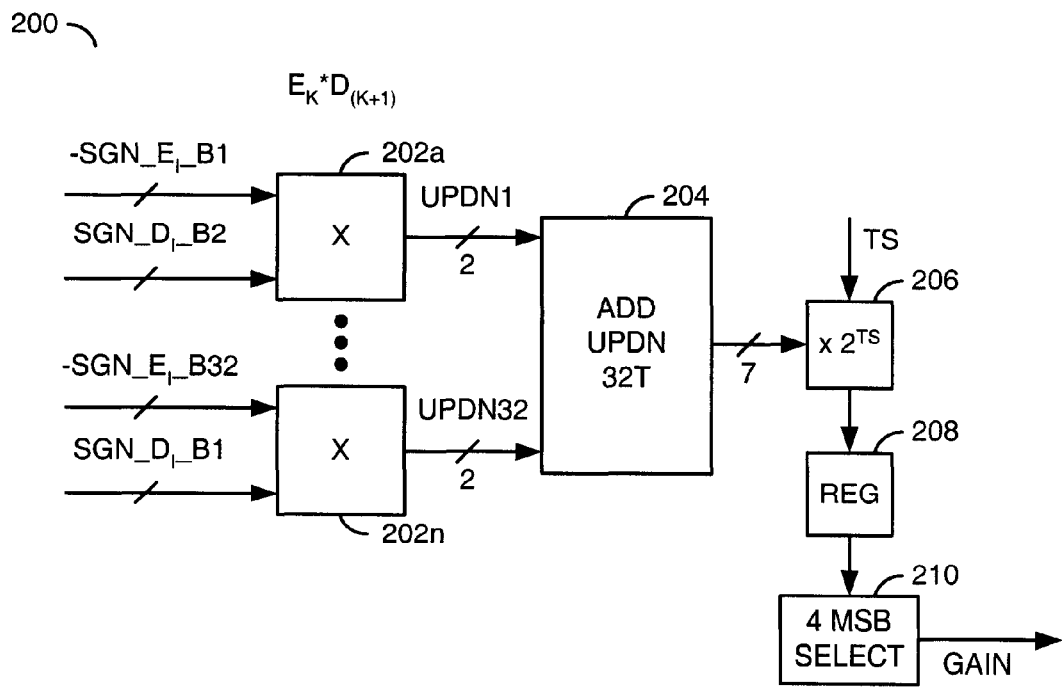
FIG. 6 is a diagram illustrating a gain adaptation process in accordance with an example embodiment of the present invention.
Figure 7A:
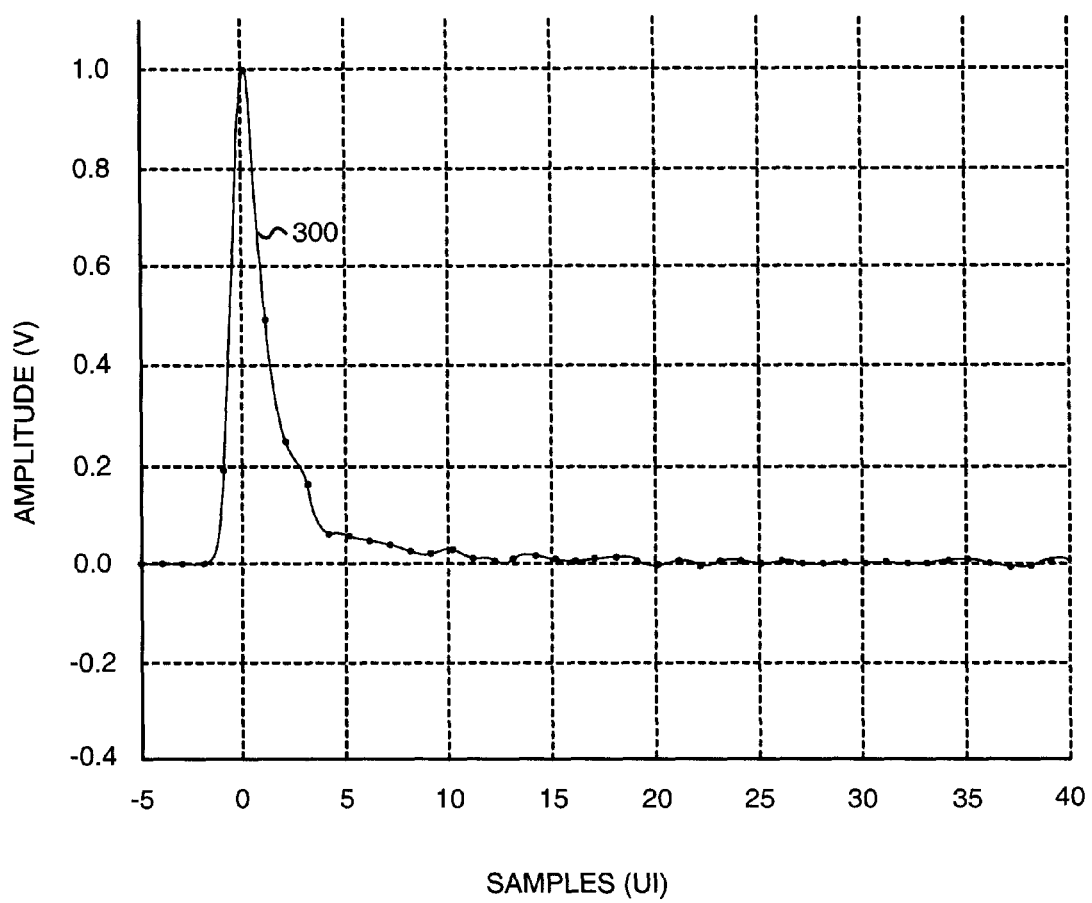
FIGS. 7A-7E are graphs illustrating an impulse response of a conventional channel and effects of various gains in a first order analog filter in accordance with an example embodiment of the present invention on the impulse response of the conventional channel.
Figure 7C:
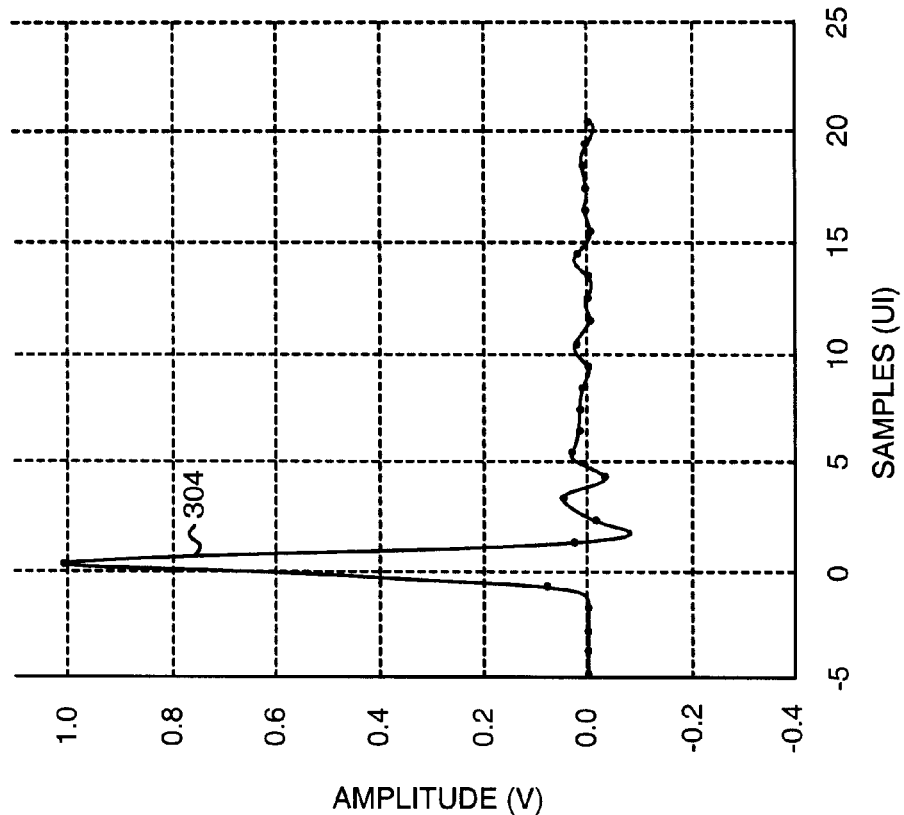
Figure 7B:
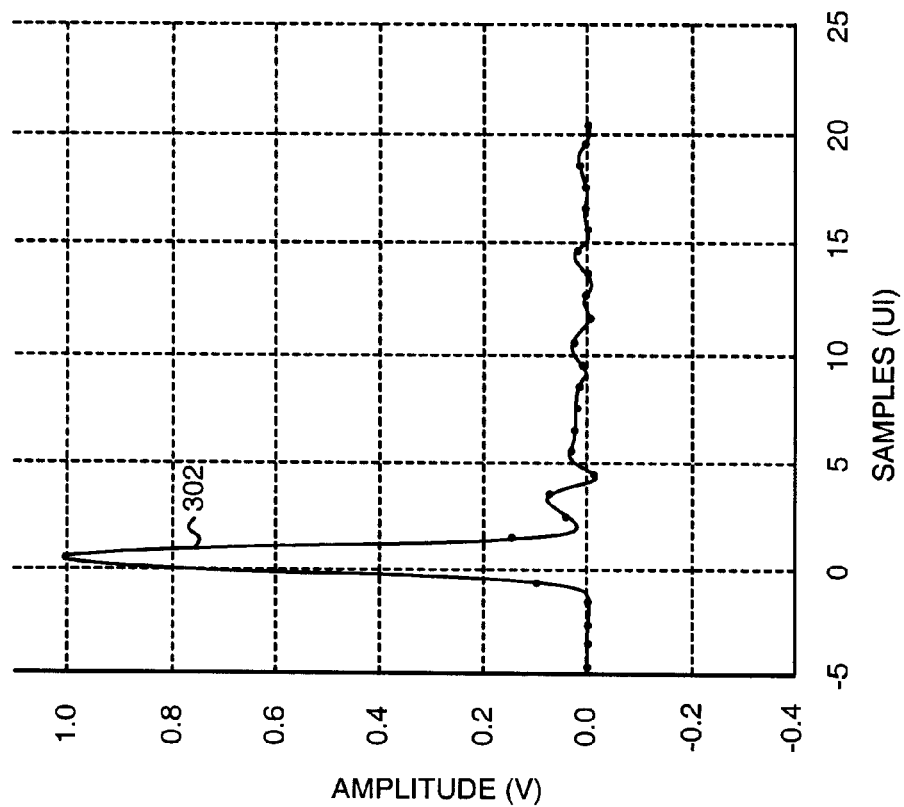
Figure 7E:
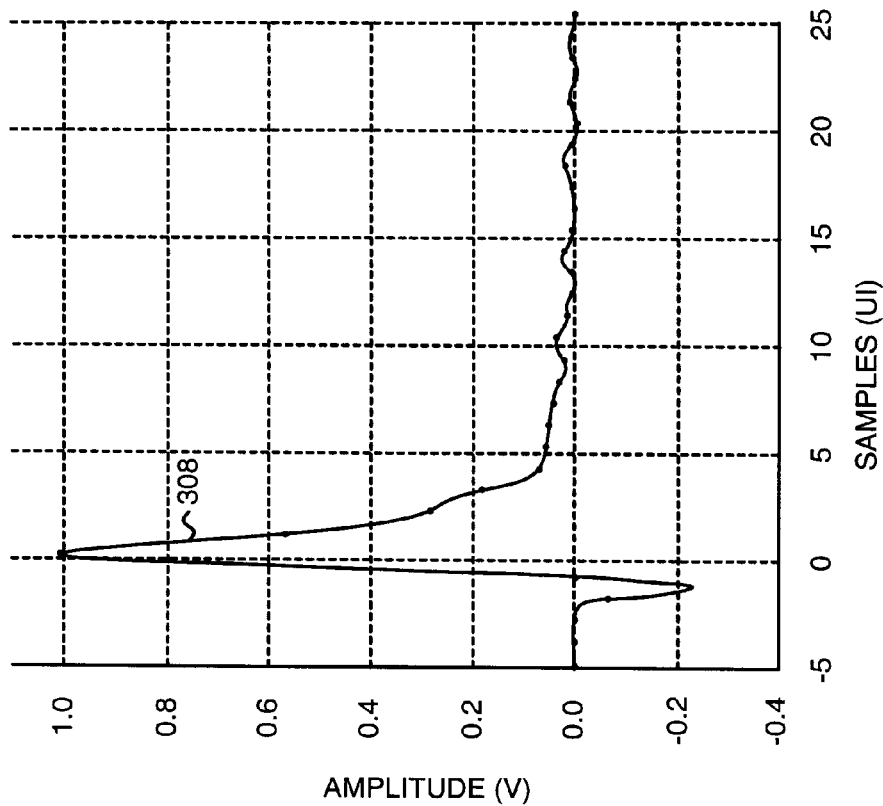
Figure 7D:
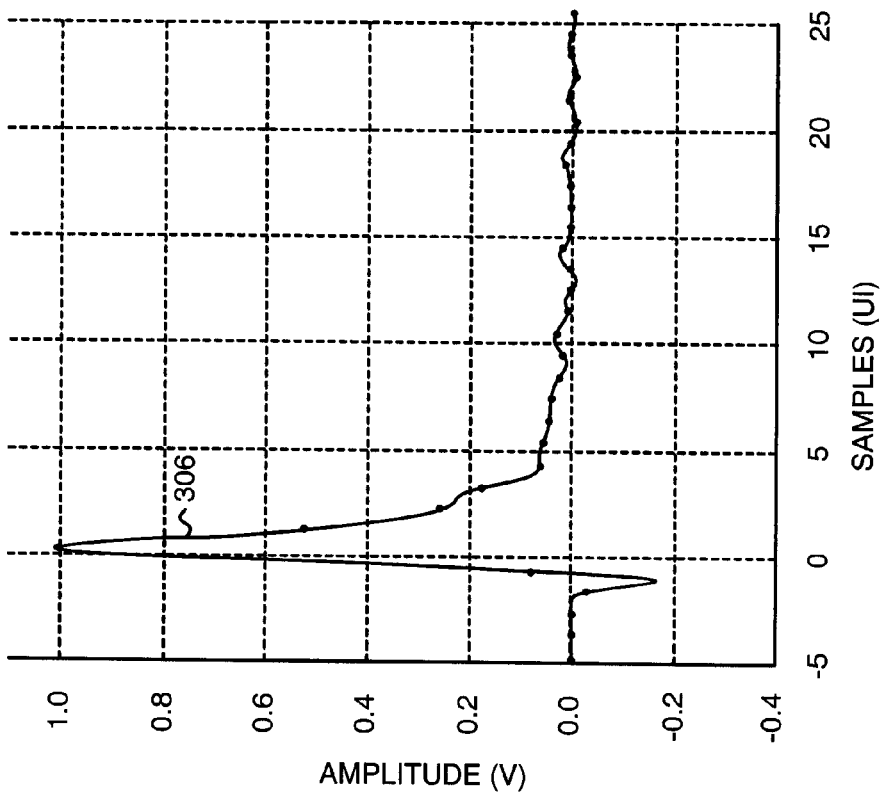

Referring to FIG. 6, a diagram is shown illustrating an example adaptation process in accordance with an example embodiment of the present invention. In one example, a number of samples of the error signal $E_K$ (e.g., $-SGN\_Ei\_B1, \ldots, -SGN\_Ei\_B32$) may be multiplied by corresponding samples of the signal $D_K$ (e.g., $SGN\_Di\_B2, \ldots, SGN\_Di\_B1$) according to the equation $E_K*D_{(K+1)}$. In one example, pairs of the signals $-SGN\_Ei\_B1, \ldots, -SGN\_Ei\_B32$ and $SGN\_Di\_B2, \ldots, SGN\_Di\_B1$ may be presented to inputs of a number of multipliers 202a-202n. The products of the signal pairs (e.g., UPDN1-UPDN32) may be summed with an adder 204. The output of the adder 204 may be multiplied by a value (e.g., $2^{\wedge}TS$), where TS represents a tap gain. The result may be stored in a register 208. A number (e.g., 4) of the most significant bits (MSB) may be selected from the value stored in the register 208 by a select module 210. In one example, the modules 202a-202n, 204, 206, 208 and 210 may be implemented as part of the adaption control module 126 and the selected MSBs presented as the signal GAIN. In another example, the blocks 204-210 may be implemented as part of the module 110 and the signals UPDN1-UPDN32 presented to the module 110 via the signal GAIN. In the particular example shown, the inputs are single bit signals (e.g., sign of the signals). In general, the inputs to the multipliers 202a-202n may be any bit width.

Referring to FIGS. 7A-7E, graphs are shown illustrating an unequalized impulse response 300 of a conventional optical channel (FIG. 7A) and curves 302-308 (FIGS. 7B-7E) representing equalized impulse responses of the conventional optical channel with various gain settings for a first order analog filter in accordance with an example embodiment of the present invention. Curves 302 and 304 illustrate equalized responses for positive gains 7s/(s+10G) and 20s/(s+20G), respectively. Curves 306 and 308 illustrate equalized responses for negative gains −5.05s/(s+10G) and −3.5s/(s+5G), respectively.

Figure 8:
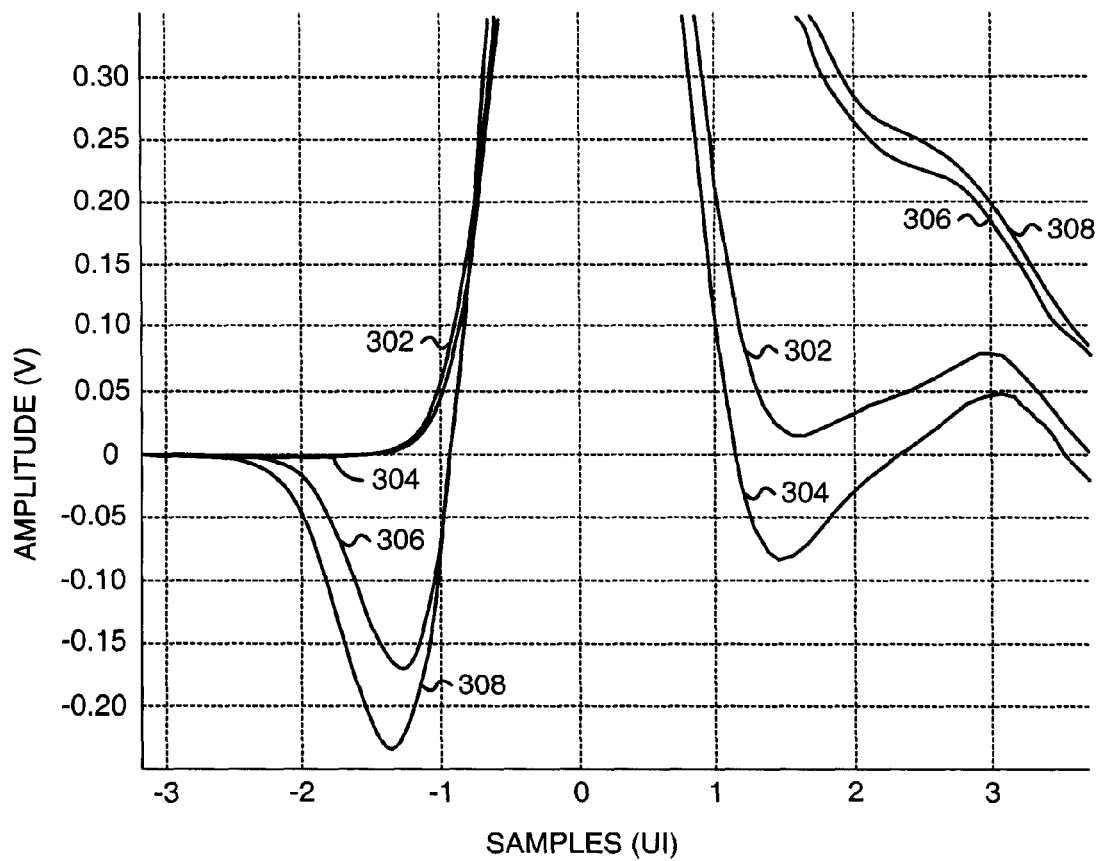
FIG. 8 is a graph comparing enlarged views of pre-cursor and post-cursor portions of the curves of FIGS. 7B-7E.

Referring to FIG. 8, a graph is shown illustrating a comparison of a zoomed view of the pre-cursor and post-cursor regions of the curves 302-308 of FIGS. 7B-7E. In general, a negative gain linear equalizer in accordance with the present invention generally reduces the first pre-cursor.

Figure 9:
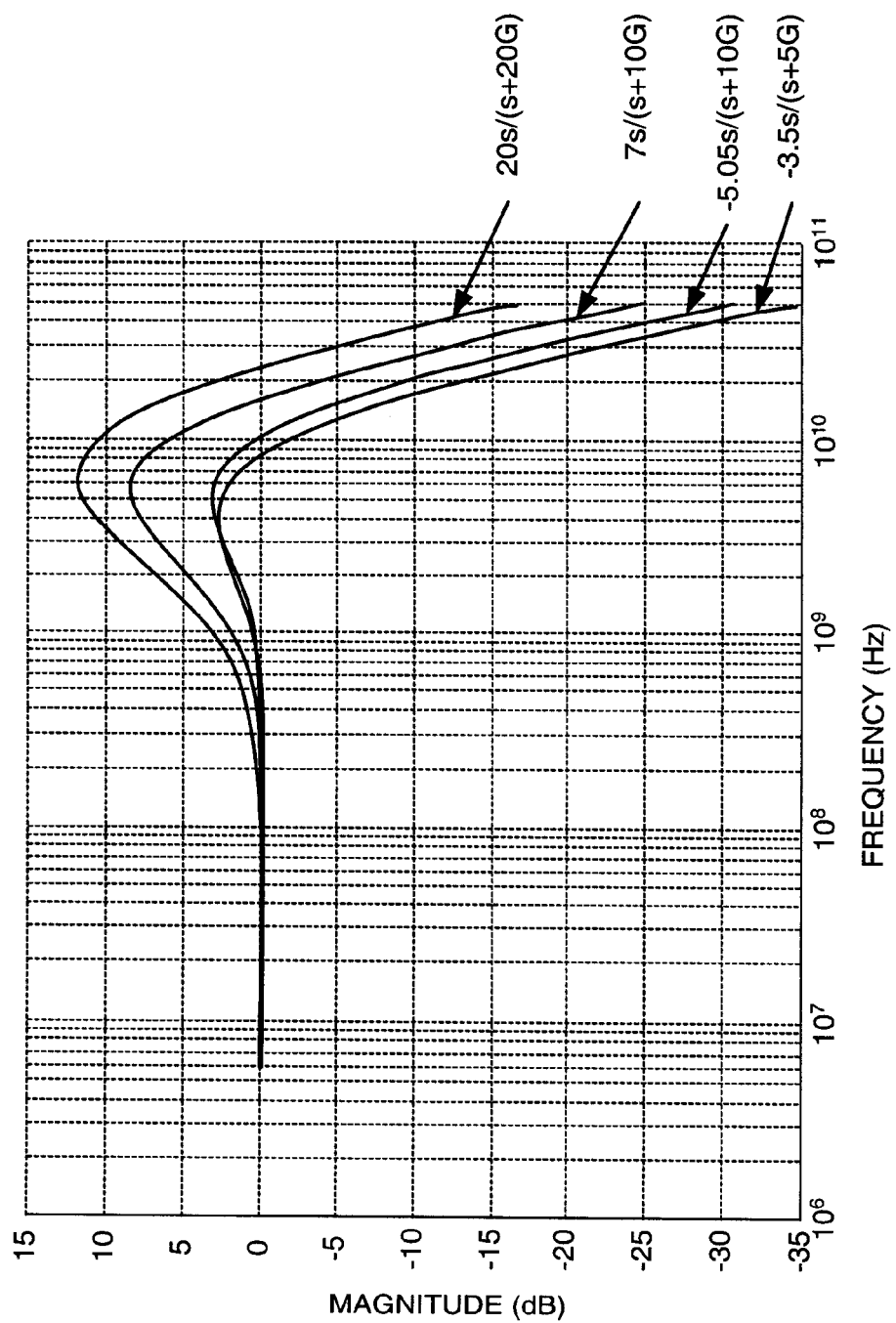
FIG. 9 is a graph illustrating corresponding frequency responses for the first order analog filters illustrated in FIGS. 7B-7E.

Referring to FIG. 9, a graph is shown illustrating corresponding frequency responses for the various gains of the first order analog filter examples illustrated in FIGS. 7B-7E.

Example embodiments of the present invention may include a method and/or apparatus for implementing precursor inter symbol interference (ISI) cancellation using a negative gain linear equalizer. The linear equalizer may use negative gain to cancel pre-cursor ISI at the receiver side of a communication channel. The linear equalizer may have a high frequency pole. Implementing the linear equalizer with the high pole may also reduce crosstalk. The linear equalizer in accordance with an example embodiment of the present invention may cancel the first precursor ISI without significantly enhancing crosstalk. The linear equalizer in accordance with an example embodiment of the present invention may allow baud-rate CDR to settle at a point where an eye margin is largest (e.g., in the middle of the eye). In one example, the linear equalizer in accordance with an example embodiment of the present invention may be implemented with an order equal to or greater than 1. When the linear equalizer is implemented with an order greater than 1, the linear equalizer may have several poles and gain settings.

The present invention may be implemented as analog circuitry, digital circuitry and/or a combination of analog and digital circuitry. The present invention may also be implemented as computer executable instructions (e.g., software, firmware, etc.) stored in a computer readable medium. The function represented by the diagrams of FIGS. 3, 5 and 6 may be implemented (e.g., modeled, etc.) using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first circuit comprising a negative gain linear equalizer circuit, said first circuit configured to generate an equalized signal in response to an input signal and an equalizer parameter signal, said equalizer parameter signal causing a cancellation of pre-cursor inter-symbol interference from a plurality of symbols in said input signal; and
    a second circuit configured to generate (i) said equalizer parameter signal, (ii) a control signal and (iii) a data output signal in response to said equalized signal, said control signal causing an adjustment of said equalizer parameter signal, said adjustment of said equalizer parameter signal causing a decrease in said pre-cursor inter-symbol interference from said symbols.

2. The apparatus according to claim 1, wherein said second circuit comprises a Mueller-Muller baud-rate clock and data recovery circuit.

3. The apparatus according to claim 1, wherein said second circuit comprises a Minimum Mean-Squared-Error baud-rate clock and data recovery circuit.

4. The apparatus according to claim 1, wherein said second circuit further comprises an adaptive decision feedback equalizer.

5. The apparatus according to claim 4, wherein (i) said adaptive decision feedback equalizer is further configured to generate a feedback signal in response to said data output signal and (ii) said second circuit is further configured to generate an intermediate signal by subtracting said feedback signal from said equalized signal.

6. The apparatus according to claim 5, wherein (i) said second circuit further comprises a slicer configured to generate said output signal in response to said intermediate signal and (ii) said adjustment of said equalizer parameter signal causes sampling points to move toward a center of an eye opening at an input of said slicer.

7. An apparatus comprising:
    a first circuit configured to generate an equalized signal in response to an input signal and an equalizer parameter signal, said equalizer parameter signal causing a cancellation of pre-cursor inter-symbol interference from a plurality of symbols in said input signal; and
    a second circuit configured to generate (i) said equalizer parameter signal, (ii) a control signal and (iii) a data output signal in response to said equalized signal, said control signal causing an adjustment of said equalizer parameter signal, said adjustment of said equalizer parameter signal causing a decrease in said pre-cursor inter-symbol interference from said symbols, wherein said control signal comprises a target signal amplitude and said second circuit is further configured to generate an error signal in response to said equalized signal, said data output signal and said target signal amplitude.

8. The apparatus according to claim 7, wherein said second circuit is further configured to generate said control signal in response to said error signal.

9. The apparatus according to claim 7, wherein said second circuit is further configured to measure a rate of change in a phase of said equalized signal as said equalizer parameter signal changes.

10. The apparatus according to claim 7, wherein said adjustment of said equalizer parameter signal comprises adaptation of a gain of said first circuit in response to said error signal and said data output signal.

11. The apparatus according to claim 10, wherein said adaptation of said gain of said first circuit comprises multiplying samples of said error signal and samples of said data output signal according to an equation $E(k)*D(k+1)$, where $E(k)$ represents a sample of the error signal at a time k and $D(k+1)$ represents a sample of the data output signal at a time k+1.

12. An apparatus comprising:
    means for generating an equalized signal using a negative gain linear equalizer circuit, wherein said equalized signal is generated in response to an input signal and an equalizer parameter signal, said equalizer parameter signal causing a cancellation of pre-cursor inter-symbol interference from a plurality of symbols in said input signal; and
    means for generating (i) said equalizer parameter signal, (ii) a control signal and (iii) a data output signal in response to said equalized signal, said control signal causing an adjustment of said equalizer parameter signal, said adjustment of said equalizer parameter signal causing a decrease in said pre-cursor inter-symbol interference from said symbols.

13. A method of symbol recovery in a receiver, comprising the steps of:
    (A) generating an equalized signal in response to an input signal and an equalizer parameter signal, wherein said equalizer parameter signal causes cancellation of pre-cursor inter-symbol interference from a plurality of symbols in said input signal using a negative gain linear equalizer; and
    (B) generating (i) said equalizer parameter signal, (ii) a control signal and (iii) a data output signal in response to said equalized signal, wherein said control signal causes an adjustment of said equalizer parameter signal, said adjustment of said equalizer parameter signal causing a decrease in said pre-cursor inter-symbol interference from said symbols.

14. The method according to claim 13, further comprising performing one of Mueller-Muller baud-rate clock and data recovery and Minimum Mean-Squared-Error baud-rate clock and data recovery.

15. The method according to claim 14, further comprising (i) generating a feedback signal in response to said data output signal using an adaptive decision feedback equalizer and (ii) generating an intermediate signal by subtracting said feedback signal from said equalized signal.

16. The method according to claim 15,
further comprising generating said output signal in response to said intermediate signal using a slicer, wherein said adjustment of said equalizer parameter signal causes sampling points to move toward a center of an eye opening at an input of said slicer.

17. The method according to claim 13, further comprising generating an error signal in response to said equalized signal, said data output signal and said control signal, wherein said control signal is generated in response to said error signal.

18. The method according to claim 17, further comprising adapting a gain of said linear equalizer in response to said error signal and said data output signal.

19. The method according to claim 18, wherein adaptation of said gain of said linear equalizer comprises multiplying samples of said error signal and samples of said data output signal according to an equation $E(k)*D(k+1)$, where $E(k)$ represents a sample of the error signal at a time k and $D(k+1)$ represents a sample of the data output signal at a time k+1.

20. The apparatus according to claim 1, wherein said negative gain linear equalizer comprises an analog filter having a high frequency pole on an order of a data rate of said input signal.

\* \* \* \* \*